United States Patent [19]

Crane et al.

[11] Patent Number: 5,072,170
[45] Date of Patent: Dec. 10, 1991

[54] REVERSE PHASE ANGLE CONTROL OF A.C. POWER LOADS

[75] Inventors: Lawrence A. Crane, Irvine; Jay Boyce, Anaheim, both of Calif.

[73] Assignee: Watlow Controls, Winona, Minn.

[21] Appl. No.: 563,076

[22] Filed: Aug. 6, 1990

[51] Int. Cl.⁵ .................. H02M 5/458; G05F 5/02
[52] U.S. Cl. ............................. 323/235; 323/237; 323/320; 315/206
[58] Field of Search .............. 323/235, 237, 238, 241, 323/244, 300, 319, 320, 321, 322, 325; 315/206, 224, 226

[56] References Cited

U.S. PATENT DOCUMENTS 4,688,161  8/1987  Covington ............... 323/235 X
4,864,487  9/1989  Schnetzka, II et al. ... 323/320 X
4,870,340  9/1989  Kral ....................... 323/235

Primary Examiner—Steven L. Stephan
Assistant Examiner—Emanuel Todd Voeltz
Attorney, Agent, or Firm—Willie Krawitz

[57] ABSTRACT

AC power loads such as from transformers, motors, high in-rush heaters, air conditioners, etc., are controlled by the use of bipolar transistors, FET transistors, gate turn-off SCRs and IGBT to turn on the load at zero-cross over and to turn off the load at any point in the sine wave which produces the desired amount of power. This reduces RFI and virtually eliminates di/dt at turn on since both voltage and current start at the same zero cross-over, and hence will improve the power factor. Both analogue and digital logic systems can also be utilized to produce this type of phase control, and a wide variety of possibilities are available such as serial and parallel input, the use of full wave bridge control, etc.

12 Claims, 8 Drawing Sheets

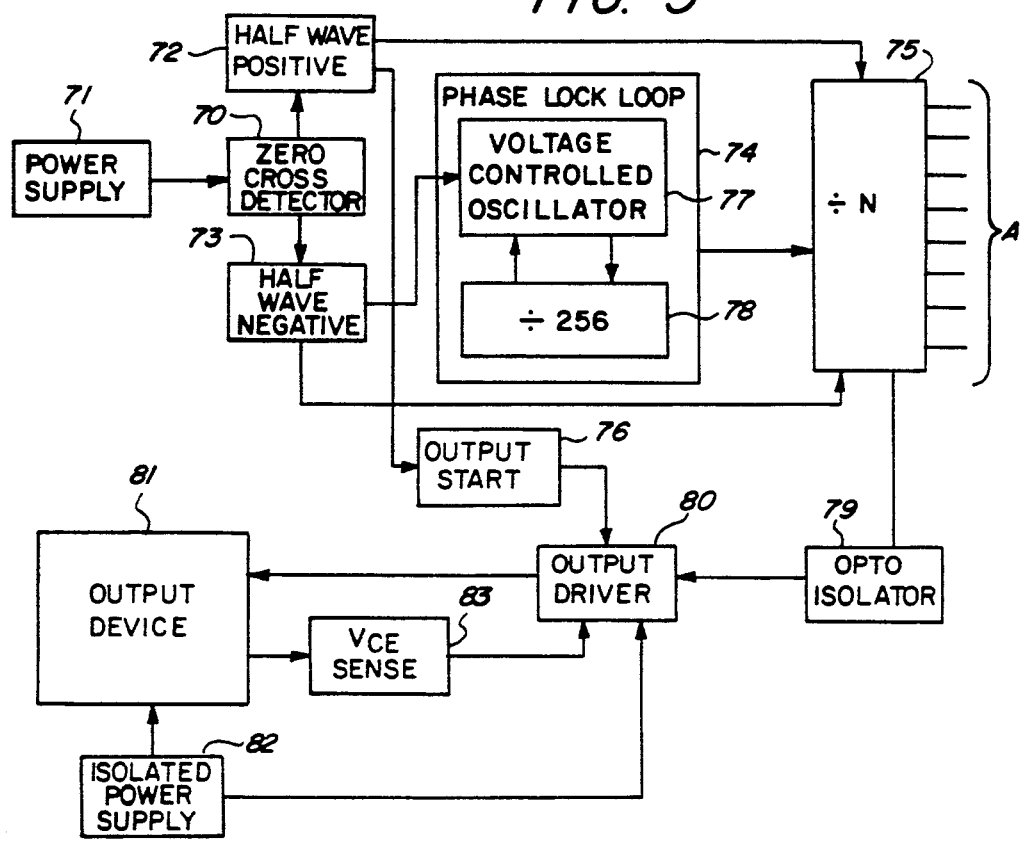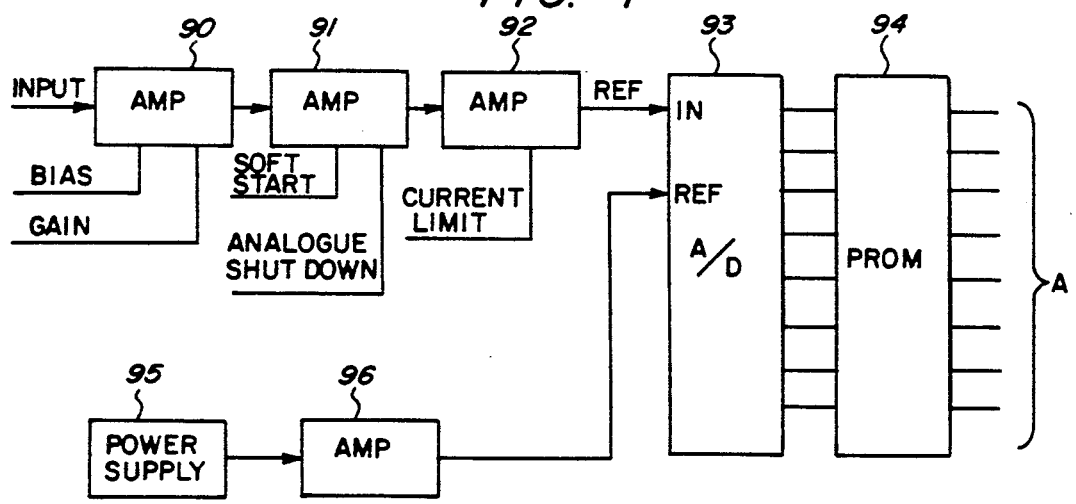

REVERSE PHASE ANGLE CONTROL OF A.C. POWER LOADS

BACKGROUND OF THE INVENTION

This invention relates to a new and improved phase control system for power sources, and more specifically to a control system using bipolar transistors, FETs, IGBTs and gate turn off SCRs to control the on-off power source, with reduced RFI and the virtual elimination of di/dt at turn on. Analogue and digital logic may also be used in the phase control system of this invention.

The use of SCRs for phase control has been well known for many years, and typical publications in this area include: U.S. Pat. Nos. 3,195,038; 3,391,332; 3,412,314; 3,577,177; 3,904,952; 4,174,496; 4,227,029; 4,258,276; 4,380,730; 4,390,795; and, 4,636,935. However, SCRs can not be turned off inside the sine wave but can only be turned on or off at zero cross-over, and hence there is a considerable power loss because the current lags significantly behind the voltage.

Moreover, SCRs produce various problems, such as excessive radio frequency interference due to harmonics caused by the fast turn on, and with the increasing use of computers and many other electronic devices, this RFI is becoming an increasing problem. Also, since the SCR turn on occurs after the cross over point, the current lags significantly behind the voltage, and this reduces the power factor.

A power control system is desired having an improved power factor, by minimizing losses due to di/dt, and also to provide a power control system with a significantly reduced radio frequency interference. It is also desired to provide a power control system which can be modified for both analogue and digital operations, as well as computer control, serial and parallel input, and bridge operations.

THE INVENTION

According to the invention, there is provided a phase control system for AC power which employs transistors, including bipolar transistors and FET transistors, gate turn off SCRs, IGBTs (insulated gate, bipolar transistor), or combinations thereof, and reversing the on-off timing sequence to enable a load turn on at the zero cross-over of the sine wave, or shortly following cross-over (e.g., about 2 degrees following cross-over) and turned off at some point within the sine wave, depending on the amount of power desired. Moreover, both analogue and digital logic systems can be utilized to produce this type of phase control, and a wide variety of possibilities are available such as in full wave diode bridges, in serial or parallel inputs, in computer controls, and so forth. Output devices which are used in the control system can be rated at 24 volts to 480 or 600 volts.

BRIEF DESCRIPTION OF THE DRAWINGS

FIG. 3 is a block diagram of a digital system in which a digital word input command is used in conjunction with a phase locked loop;

FIG. 4 is a block diagram of an analogue input to a digital controller;

Figure 1:
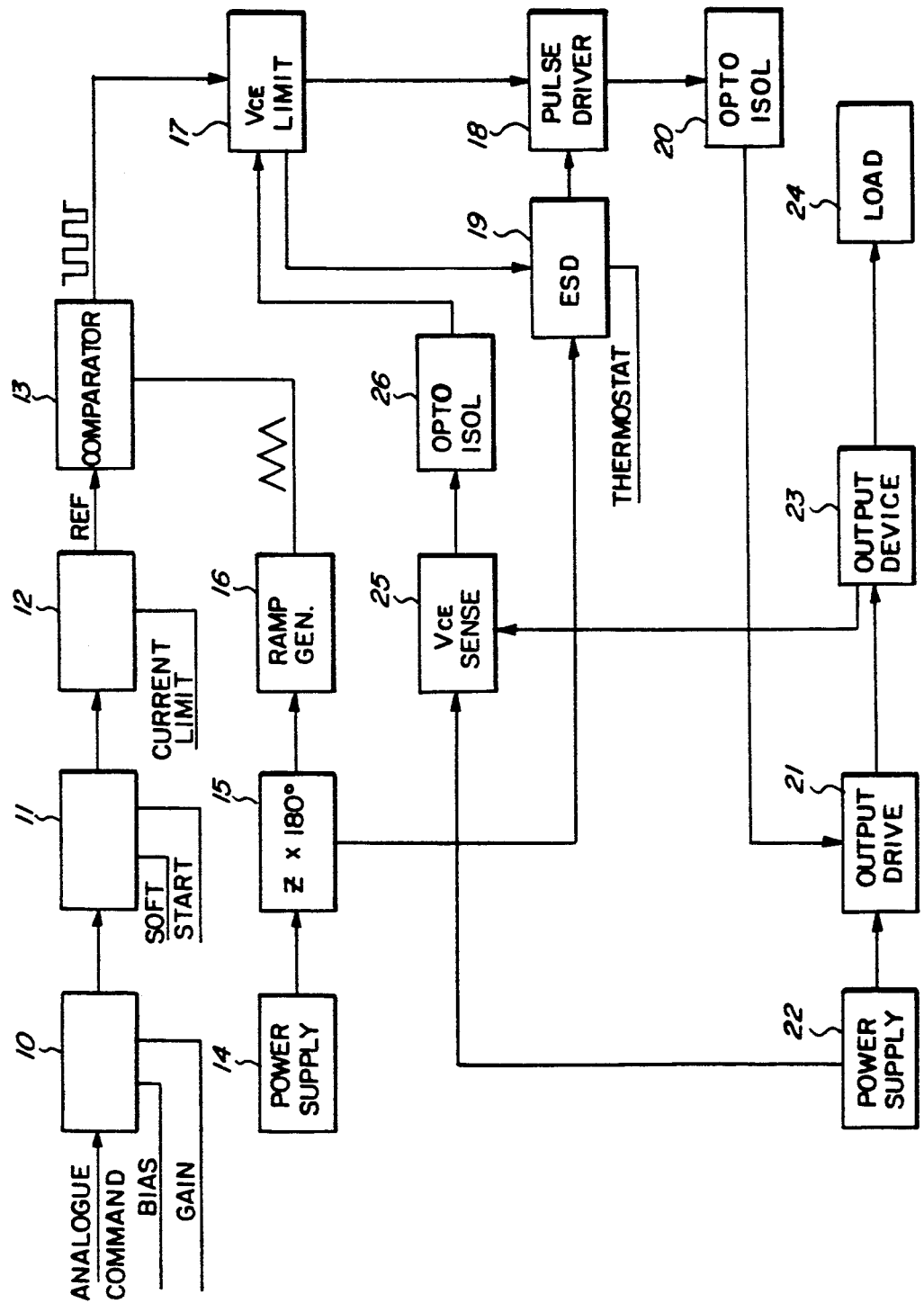
FIG. 1 is a block diagram of an analogue application of the control system of the invention for receiving a command signal from a temperature control or other input device.

DESCRIPTION OF THE PREFERRED EMBODIMENTS:

An embodiment of this invention is shown in FIG. 1, and comprises an amplifier 10 for receiving an input analogue command signal from say a heating system where the analogue signal may be derived from a temperature controller. A bias and gain signal is supplied to the amplifier to set the proper signal to the amplifier for the device.

The signal is then fed to an amplifier 11 to enable effecting a soft start (by a linear ramp) within say about four (4) seconds or to effect an analogue shut down. The signal is then fed from amplifier 11 to an amplifier 12 with a current limiter input to retard the output if current limiting is used. Output from the current limiting amplifier is fed as a reference input to a comparator 13.

A supply 14 provides regulated +5 V and −5 V from unregulated B+ and 120 Hz, to a ZX180 (zero cross-over @180 degrees) synch signal generator 15 which converts the 120 Hz to a sync signal that sets the start of each half cycle. The half cycles from the synch signal generator 15 are fed to a ramp generator 16 which converts the half cycles to a linear sawtooth wave form which rises linearly from the start to the end of each half cycle.

The comparator 13 compares the input analogue signal with the signal from the ramp generator 16 and produces a square wave beginning with each half cycle and lasting until the desired percentage of power point is reached within the cycle. Output from the comparator is fed to a Vce limit 17 which is used only in conjunction with a transistor or an IGBT output and provides overload protection by shutting down the load. The signal from the Vce limit 17 and the drive signal from the signal generator 15 are fed into and summed by a pulse driver 18. An ESD (Emergency Shut Down) 19 will lock out the drive signal from the signal generator 15 if one half of the cycle is lost, or the Vce limit trips, or if a thermostat signals that a sensed temperature is too high.

The signal from pulse driver 18 drives an opto isolator 20 into the output driver 21. Together with the isolated power supply 22, the output driver supplies sufficient current to turn on an output device 23 and power a load 24. If turn off circuitry is desired, a second output drive and isolated power supply are required. If the voltage across the output device 23 is too high (indicating a short), a signal is sent to a voltage sense 25, and then to the Vce limit 17 through an opto isolator 26. The Vce limit 17 will then trip the ESD 19 and lock out the drive signal from the signal generator 15.

Figure 2:
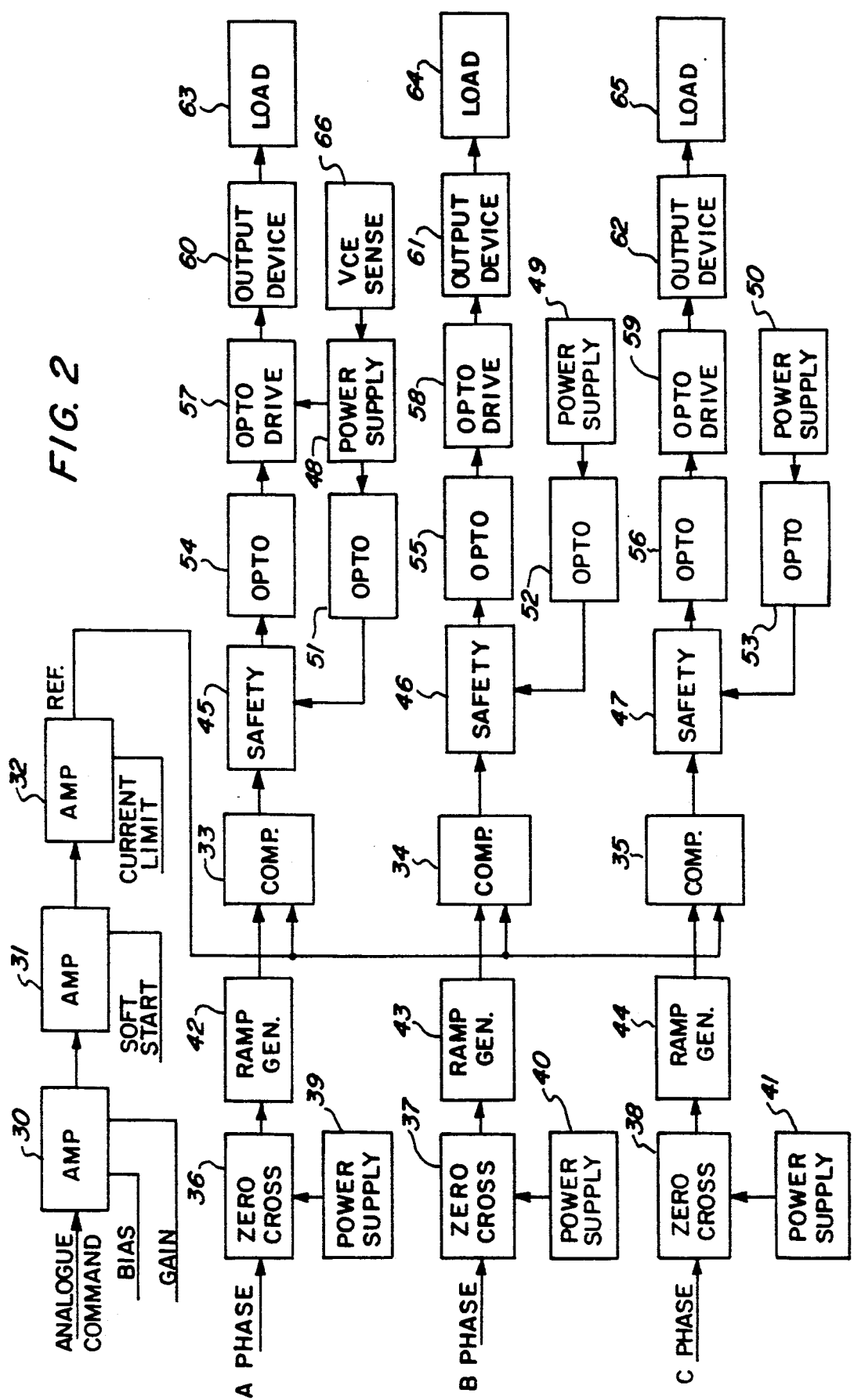
FIG. 2 is a block diagram of a three phase control system using an analogue control signal.

A three phase analogue system is shown in FIG. 2, and comprises an input analogue signal from a source similar to that shown in FIG. 1, which is fed to an amplifier 30 for receiving the input signal and to which a bias and gain are supplied to set the proper output signal. The signal from amplifier 30 is fed to an amplifier 31 to enable a soft start within a few seconds, or to effect an analogue shutdown. Output from amplifier 31 is then fed to an amplifier 32 to which is applied a current limit signal. A reference signal from amplifier 32, which is the analogue command signal modified by the soft start and current limit signals from amplifiers 30 and 31, is then fed to comparators 33, 34, 35.

Zero cross-over signals from detectors 36, 37 and 38 which are powered by separate power supplies 39, 40, 41 are fed to respective ramp generators 42, 43, 44. The output signals from the ramp generators, in the form of linear sawtooth waves are fed to the respective comparators 33, 34 and 35. The comparators compare the modified reference analogue signal from amplifier 32 with the respective signals from the ramp generators 42, 43, 44 and form respective square waves beginning with each half cycle and lasting until the desired percentage of power point is reached within the cycle.

Output from the comparators 33, 34 and 35 are then fed respectively to safety circuits 45, 46 and 47, similar to the ESD circuits of FIG. 1. The safety circuits are driven from isolated power supplies 48, 49 and 50 using respective opto isolators 51, 52 and 53. The safety circuits will lockout if one half of the cycle is lost, or if the limits of the comparators 33, 34 and 35 are exceeded, or if a sensed condition such as temperature is too high.

Signals are passed by safety circuits 45, 46 and 47 to opto isolators 54, 55, 56 and then to output drivers 57, 58 and 59 which are powered from the power supplies 48, 49, 50. The output drivers then feed output devices 60, 61 and 62 which control respective loads 63, 64 and 65. A Vce sense circuit 66 is provided to sense if an output signal from output device 60 is too high, indicating say, a short, and this will lock out power supply 48 and shut down the system.

A digital form of the phase control system of this invention is shown in FIG. 3, and comprises a zero crossing detector 70 powered from a supply 71. The zero crossing detector provides positive half cycles 72 and negative half cycles 73 to indicate the beginning of each half cycle, the half cycles synchronizing a phase locked loop 74 with a divide/N delay counter 75 and an output start circuit 76. The phase locked loop 74 includes a voltage controlled oscillator 77 and a divide/256 counter 78, with the phase locked loop 28 running at 256 times the wave power line frequency. A digital command word "A", say from an A/D converter (see FIG. 4, infra) is sent to the delay counter 75 as an 8, 10, 12, 16 or higher level bit word.

Start signals are fed to the delay counter which is clocked with the VCO phase locked loop 74 to obtain a fine, discrete, linearized division of the sine wave signal, a typical discrete division being 1/256 half cycle. Hence, if the input command word "A" is set to turn on, for example, at 50% power, the delay counter is set to produce a firing signal one-half through the sine wave, i.e., at a divide setting of 128/256. With the phase locked loop running at 256 times the half wave power line frequency, at 60 Hz, and an 8 bit word, this is 30.72 Khz.

With the phase locked loop running at 256 times the half wave power, 256 steps for each half cycle are provided to control the turn off delay after the start of each half cycle, with the counter 75 being cleared at the cross-over point. The signal is sent by the divide/N counter 75 to an opto isolator 79. The signal from the opto isolator is fed to an output driver 80 to terminate the output at 50%, and this will turn off the output start circuit 76 which had been previously started. Hence, signals from the output start circuit 76 and the divide/N counter 75 will control an output device 81. An isolated power supply 82 functions to power the output driver 80 and the output device 81. A Vce sense circuit 83 functions to detect if the output power is too high, and will turn off the output driver 80 within a few microseconds.

A three phase version of the embodiment of FIG. 3 is easily accomplished by operating the phase locked loop at three times the frequency of the single phase unit, adding two more divide/N counters, dividing the full cycle by 6 to start the divide/N counters at the beginning of each half cycle, and adding two more output drivers, and isolated power supplies.

The embodiment shown in FIG. 3 may instead employ time proportioning of full cycle increments with reverse current limiting or reverse soft start at zero cross-over. This mode of operation will reduce or eliminate the need for high speed fuses, because shut-down of the system will occur faster than the fuses will blow out.

FIG. 4 shows a block diagram of a serial input to a digital controller for use in the phase control system of this invention as shown in FIG. 3, and comprises an amplifier 90 which receives an analogue input, the amplifier being set for bias and gain to properly adjust for the input signal. The signal from the amplifier 90 is fed to an amplifier 91 to enable effecting either a soft start or an analogue shut down. The amplified signal is then fed to an amplifier 92 with a current limiter input to retard the output if current limiting is used. The current limited signal from the amplifier 92 is forwarded to an A/D converter 93 which forms an 8 bit word and feeds it to a PROM 94. The 8 bit word is conditioned and linearized by the PROM which rearranges the words into an output word "A" for the divide/N counter 75. A power supply 95 feeds unregulated DC power to an amplifier 96 for line voltage compensation, and this is fed to the input of the A/D converter.

Figure 5:
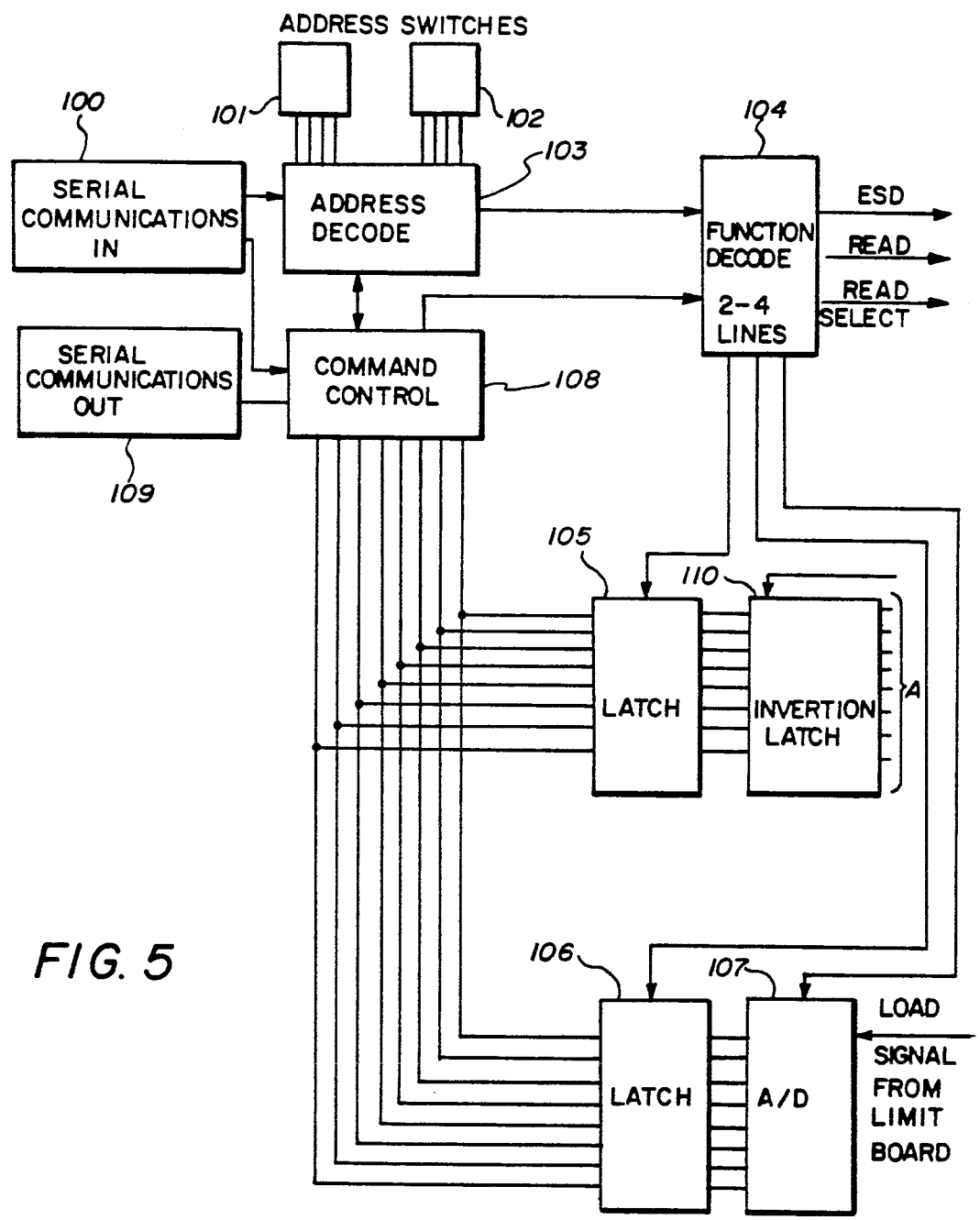
FIG. 5 is a block diagram of a serial communication input to a digital controller.

A block diagram of a serial input-output is illustrated in FIG. 5, and comprises an input 100 from one or more computer controllers which may take the form of a two wire, three wire, or by fiber optics. Each controller has an address set given by address switches 101, 102 and an address decode 103. When a controller recognizes its address set in a function decode 104, it will cycle until it receives a command such as an emergency shut down (ESD), a read signal, a read and select signal, etc. The base number and succeeding number of each controller is used with a read (R) or write (W) to select a function.

A write command to the base number followed by any two hex codes will trip the ESD and shut down the controller via the function decode 104. The function decode feeds latches 105, 106 and an A/D converter 107, and a read command (base number) switches a current limit board to current, which is then read into the A/D converter. The A/D output is then latched into the bus by latch 106 and to the controller via COM CONTROL 108 and the serial communications output 109. A read command to the base number +1 will send the load voltage back to the back to the computer controller. A write to the base number +1 followed by any two hex codes will set the power level word on the bus out of the COM CONTROL 108 via latch 105. When a command cycle ZX360 is fed to inverting latch 110, it will update the word "A" for the divide/N counter 75 shown in FIG. 3.

Figure 6:
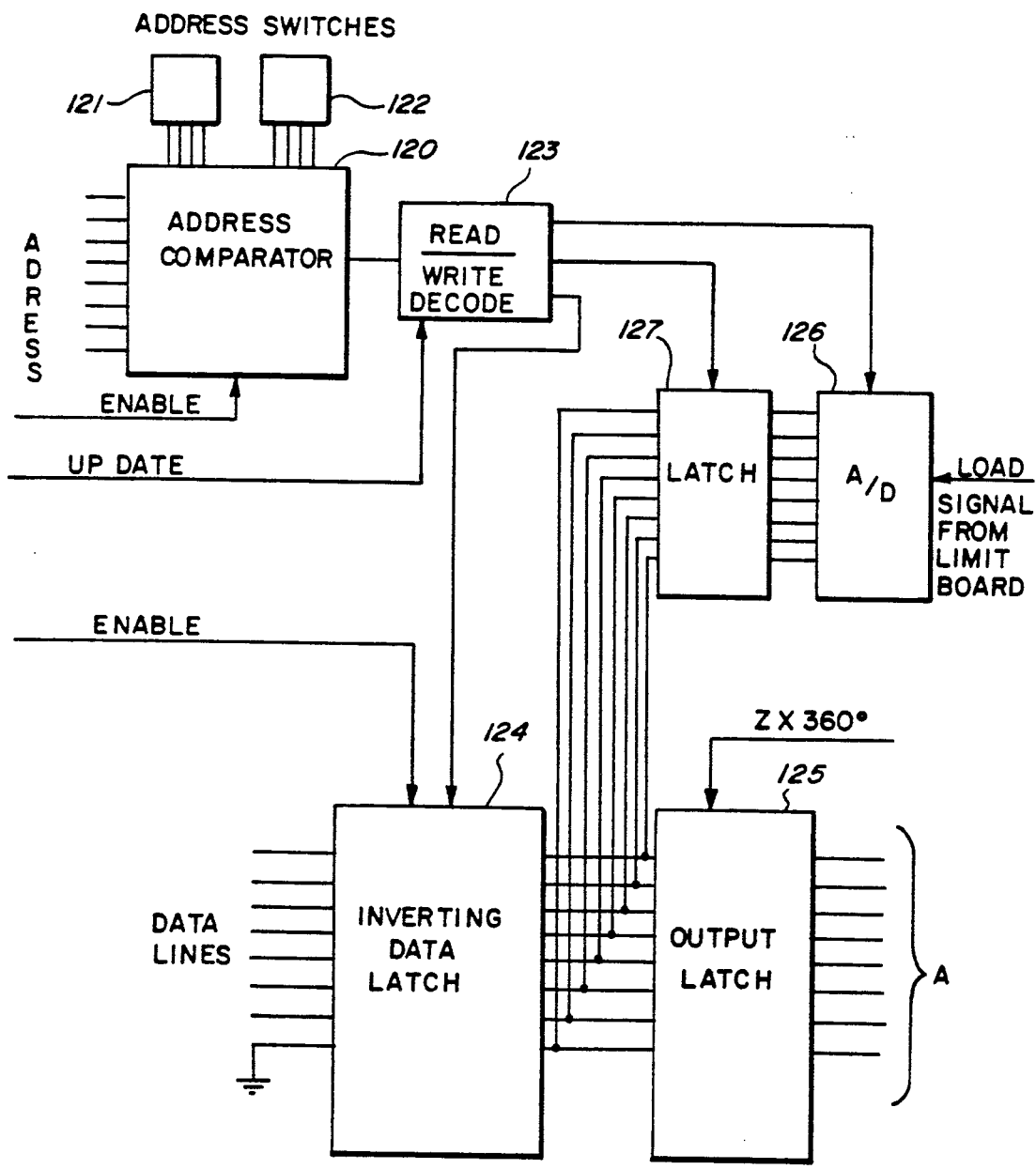
FIG. 6 is a block diagram of a parallel input to a digital controller.

A parallel input to a digital controller illustrated in FIG. 6 comprises an address comparator 120 which selects address inputs from address sets supplied from an address switch 121 and an input address 122. Output from the comparator is fed to a read/write decode 123 which feeds an inverting data latch 124, and data fed into the data latch 124 from a given controller is selected and fed to an output latch 125. A signal from the read/write decode 123 is fed along with a read load signal from a limit board into an A/D converter 126. The signal from the decode 123 is latched into the bus by a latch 127, and along with the data from A/D converter 126, is combined with the data from inverting data latch 124 into the output latch 125 along with a ZX360 signal to produce an output word "A" for the divide/N circuit in FIG. 3. Although the operation of the parallel input requires 20 lines, data transfer is much faster than in the serial input of FIG. 6.

Figure 7:
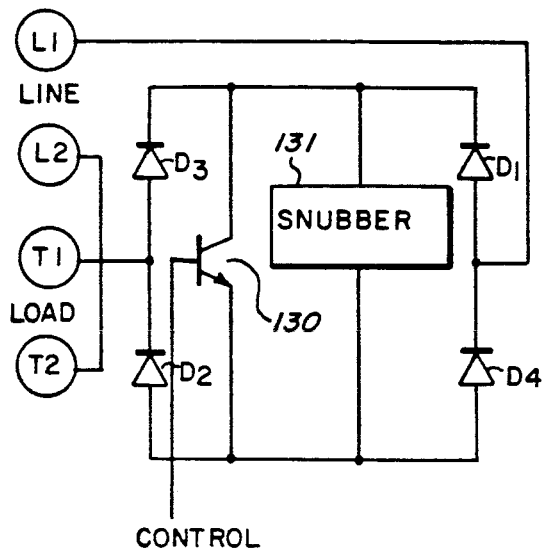
FIG. 7 is a circuit diagram showing transistors in a full wave bridge used for phase control.
Figure 8:
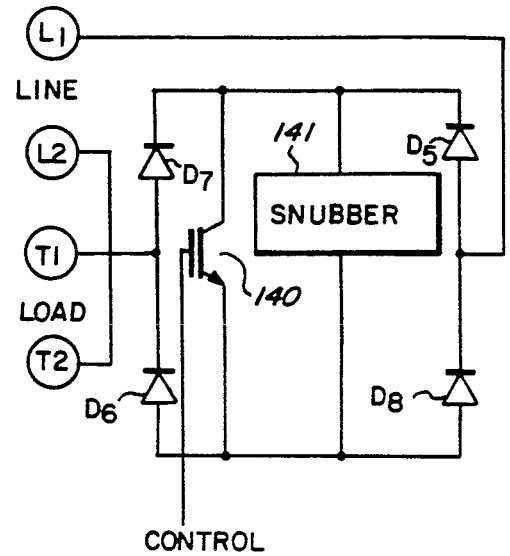
FIG. 8 is a circuit diagram showing an IGBT in a full wave bridge similar to the NPN transistors of FIG. 7.

Full wave bridge circuits utilizing an NPN Darlington transistor and IGBT respectively, are shown in FIGS. 7 and 8. In FIG. 7, an input current flow for the first half cycle is passed from L1 through diode D1, through transistor 130, and returns through diode D2 to T2. The second half cycle passes from T1 through diode D3, transistor 130 and diode D4 to L1. A zero cross-over synch control signal is applied to the transistor to initiate turn on at cross over and then turn off within an appropriate point in the sine wave. The snubber 131 functions to minimize inadvertent dv/dt turn on, and to protect the devices at turn off.

FIG. 8, shows a similar use of an IGBT in a full wave bridge circuit, where current in the first half cycle is passed from L1 to diode D5, then to IGBT 140, diode D6 and T1. In the second half cycle, current is passed from T1 to D7, the IGBT 140, diode D8, and then to L1. Since an IGBT requires less base drive than a Darlington transistor, it should be easier to control.

Figure 9:
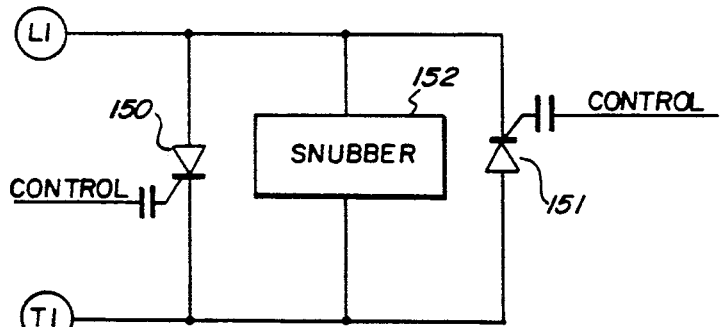
FIG. 9 is a circuit diagram showing gate turn off SCRs used to turn off inside the sine wave cycle.

In FIG. 9, two GTO SCRs 150, 151 are shown being used in reverse phase control since they can be turned off inside the sine wave, unlike ordinary SCRs. Current in the first half cycle is passed from L1 through GTO 150 and to T1, and in the second half cycle is passed from T1 to GTO 151 to L1. The snubber 152 performs the same function as snubbers 131 and 141 in FIGS. 7 and 8.

Figure 10:
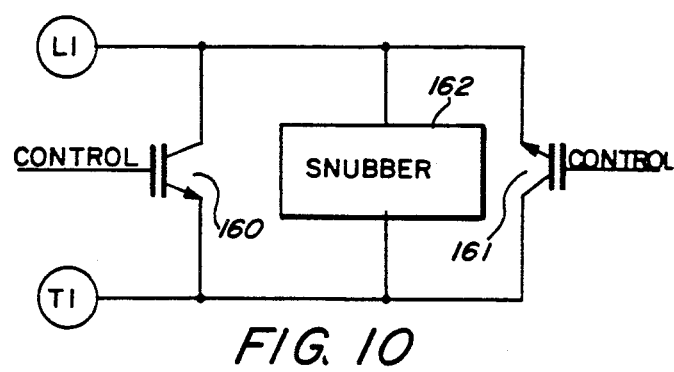
FIG. 10 is a circuit diagram showing IGBTS in a back-to-back mode used to turn off inside the sine wave cycle; and, FIGS. 11 and 12 show respective oscilloscope trace outputs produced when using a standard SCR turn-on circuit and when using the phase control system of this invention.

FIG. 10 shows another type of back-to-back NPN Darlington transistors 160, 161 used in reverse phase control, with a zero cross-over control signal being applied to the bases of the transistors. Current in the first half cycle is passed from L1 through transistor 160 to T1. In the second half of the cycle, current from T1 is passed through transistor 161 back to L1. The snubber 162 minimizes inadvertent dv/dt turn on and protects the devices at turn off.

Figure 11:
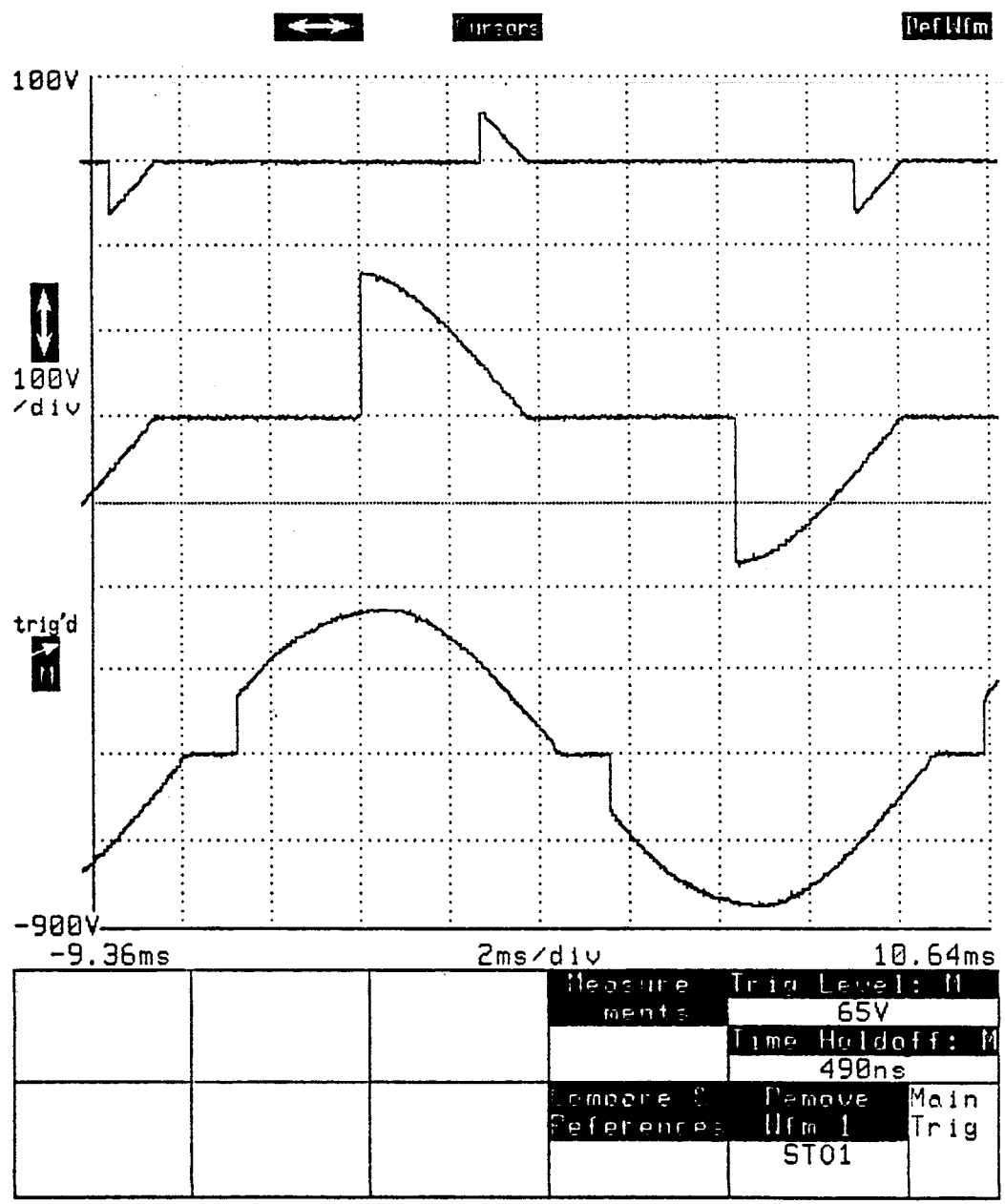
Figure 12:
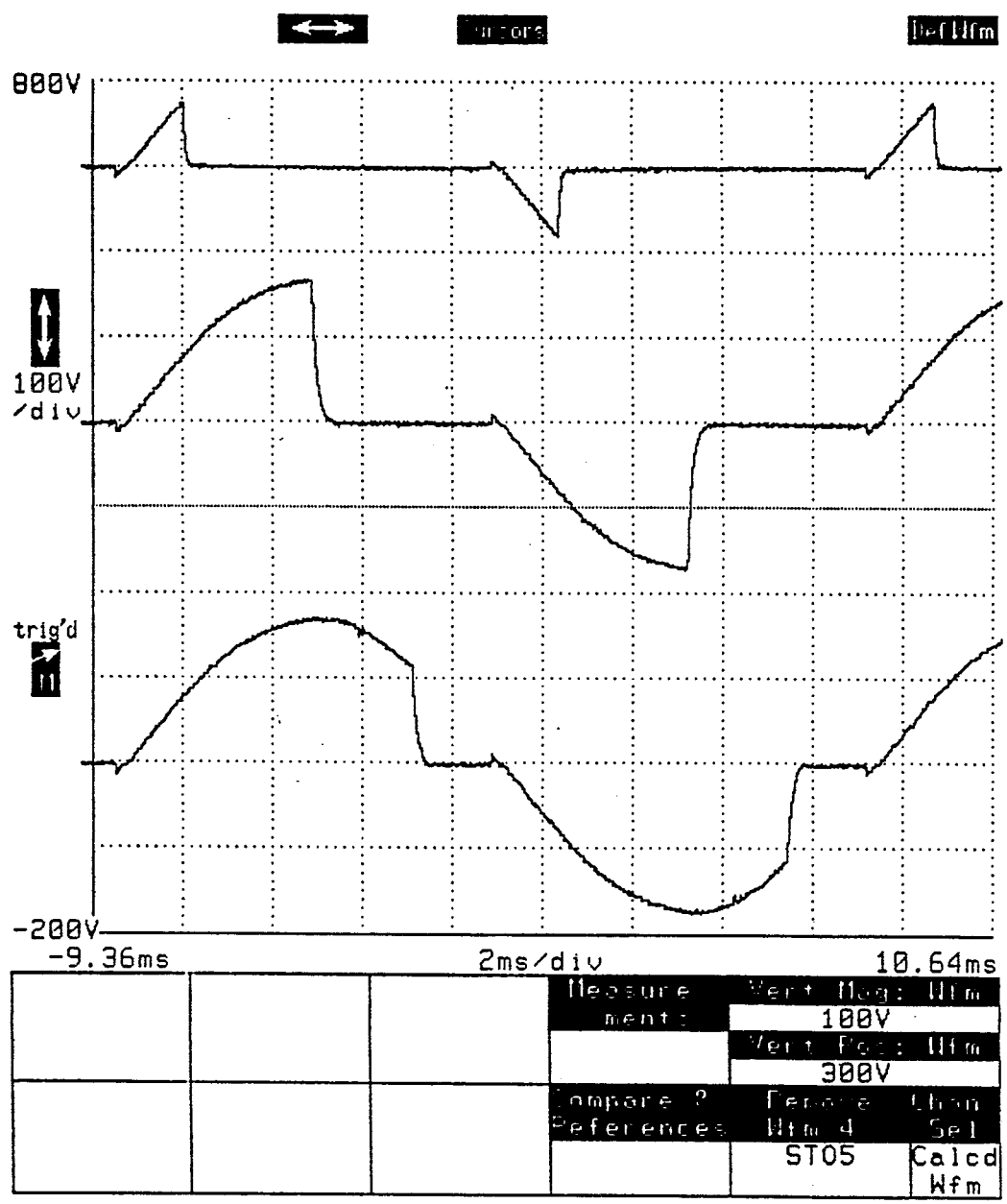

FIGS. 11 and 12 show the difference between turn on and turn off using an SCR versus bipolar transistors, FET transistors, IGBT, or GTOs, using a printout from a digitizing oscilloscope. In FIG. 11, the traces represent a delayed turn on by an SCR followed by a turn off at phase reversal.

By contrast in FIG. 12, using the reverse phase control system and components of this invention, the three traces show that the on off responses are equivalent to those of the SCR (albeit in reverse). However, since the turn off response of this invention can be accomplished within the sine wave, this enables the area under the curve, i.e., the percentage of power reduction to be accurately controlled. Furthermore, the voltage and current start at zero, and are in phase with the command turn off, and results in reduced RFI interference due to harmonics, and with a reduced power factor loss.

We claim:

1. An apparatus for reverse phase angle control of A.C. power loads, comprising:
    (a) means for receiving input command signals from a process system; and,
    (b) logic means for converting the input command signals to output turn-on and turn-off command signals, said converting means consisting of digital logic devices for turning on the A.C. power load at and generating serial or parallel pulse trains referenced to zero cross-over of a sine wave, and turning off the A.C. power load at a selected point within the sine wave to produce a controlled amount of output power, with current and voltage both starting at zero cross-over, thereby improving output power factor, and reducing radio frequency interference and di/dt.

2. The apparatus of claim 1, comprising an A/D converter signal means to provide digital signals to a delay counter clocked from a synchronized phase locked loop, and start signal means feeding the delay counter to produce a turn-on signal at zero cross-over of an output sine wave, and to turn off when a desired percentage power point is reached within the output wave.

3. The apparatus of claim 2, comprising an A/D converter signal input means to provide digital signals to a divide/N delay counter clocked from a synchronized VCO phase locked loop to obtain a discrete, linearized division of an input sine wave signal, signals from the start signal means and the divide/N delay counter functioning to turn off the power load.

4. The apparatus of claim 2, comprising analogue signal input means feeding an A/D converter, and PROM means fed by the converter, the PROM means being adapted to linearize and rearrange input words from the converter to serially feed a word counter.

5. The apparatus of claim 1, comprising input means from at least one controller; address recognizing means associated with each controller; function decode means for instructions and addresses associated with signals for each controller; an A/D converter for receiving load signals; a latch for receiving command cycles from a zero cross-over input and for updating and transmitting an output turn-off command word during a cycle when a desired percentage of power load is reached; and a command control for receiving input instructions from the controllers, for transmitting the load signals and controller address signals to the controllers, and for transmitting the updated turn-off command words to a turn-off counter for the controllers, the input and output signals for the controllers being serially transmitted.

6. The apparatus of claim 1, comprising: an input address receiving means; an input data signal receiving means; A/D load signal input means; and an output latch for combining data from the input data signal receiving means with a signal from the A/D load input means and a cross-over signal, to form an output word for a turn off counter thereby producing a turn-off signal, the input address receiving means and the input data signal receiving means being in parallel.

7. An apparatus for reverse phase angle control of A.C. sine wave power loads, comprising:
  (a) means for receiving input analogue command signals from a process system; and,
  (b) means for comparing the input command signals with a timing function generator to produce a logic square wave output for turning on and turning off an output power device said logic square wave output being adapted to turn on the A.C. sine wave power load at zero cross-over of an A.C. sine wave and to turn off at a selected point within the A.C. sine wave to the output power device, thereby producing a controlled amount of output power, the current and voltage both starting at zero cross-over, with a resulting reduction in radio frequency interference, reduced di/dt, and an improved output power factor.

8. The apparatus of claim 7, comprising means to feed three input analogue command signals to three corresponding comparators.

9. The apparatus of claim 7, comprising time proportioning of full cycle increments with reverse current limiting or reverse soft start at zero cross-over.

10. An apparatus for reverse phase angle control of A.C. power loads, comprising:
  (a) means for receiving input command signals from a process system; and,
  (b) logic means for converting the input command signals to output turn-on and turn-off command signals, said converting means comprising an A/D converter, and PROM means fed by the converter, the PROM means being adapted to linearize and rearrange input words from the converter to serially feed a delay word counter to preset the delay counter clocked from a synchronized phase locked loop, and start signal means feeding the delay counter to produce a turn-on signal at zero cross-over of a sine wave, the delay counter turning off the A.C. power load at a selected point within the sine wave to produce a controlled amount of output power, the current and voltage both starting at zero cross-over, thereby improving output power factor, and reducing radio frequency interference and di/dt.

11. An apparatus for reverse phase angle control of A.C. power loads, comprising: input means for receiving a signal from at least one computer controller for a process system; address recognizing means associated with each controller; function decode means for instructions and addresses associated with signals for each controller; an A/D converter for receiving load signals; a latch for receiving command cycles from a zero cross-over input and for updating and transmitting an output turn-off command word during a cycle when a desired percentage of power load for the process system is reached; and a common control for receiving input instructions from the controllers, for transmitting the load signals and controller address signals to the controllers, and for transmitting the updated turn-off command words to a turn-off counter for the controllers, the input and output signals for the controllers being serially transmitted.

12. An apparatus for reverse phase angle control of A.C. power loads, comprising:
  input data signal receiving means for receiving input command signals from a process system; an input address receiving means; A/D load signal input means; and an output latch for combining data from the input data signal receiving means with a signal from the A/D load signal input means and a zero cross-over sine wave signal, to form an output word for a turn off counter thereby producing a turn off signal for turning off the A.C. power load at a selected point within the sine wave to produce a controlled amount of output power, with current and voltage both starting at zero cross-over, thereby improving output power factor, and reducing radio frequency interference and di/dt, the input address receiving means and the input data signal receiving means being transmitted by parallel communication.

* * * * *